United States Patent
Gross et al.

(10) Patent No.: US 6,547,338 B2
(45) Date of Patent: Apr. 15, 2003

(54) INDIVIDUAL SEGMENT ADHESIVE CORRECTION WEIGHT

(75) Inventors: Peter L. Gross, Indianapolis, IN (US); Todd L. Eck, New Palestine, IN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/817,600

(22) Filed: Mar. 26, 2001

(65) Prior Publication Data

US 2002/0135223 A1 Sep. 26, 2002

(51) Int. Cl.$^7$ ................................................ F16F 15/32
(52) U.S. Cl. ........................................................ 301/5.21
(58) Field of Search ............................ 301/5.21; 73/468

(56) References Cited

U.S. PATENT DOCUMENTS

| | | | |
|---|---|---|---|
| 2,029,132 A | | 1/1936 | Skelton |
| 2,292,024 A | * | 8/1942 | Dreher ........................ 40/140 |
| 2,640,727 A | | 6/1953 | Kennedy |
| 3,154,347 A | | 10/1964 | Griffith |
| 3,177,039 A | | 4/1965 | Skidmore |
| 3,273,941 A | * | 9/1966 | Skidmore ................... 301/5.21 |
| 3,748,910 A | | 7/1973 | Hofmann |
| 3,786,850 A | | 1/1974 | Turoczi, Jr. |
| 3,960,409 A | * | 6/1976 | Songer ........................ 301/5.21 |
| 4,300,803 A | * | 11/1981 | Chorosevic ................. 301/5.21 |
| 4,379,596 A | | 4/1983 | Green et al. |
| 5,557,043 A | | 9/1996 | Dreschsler |
| 5,831,152 A | | 11/1998 | Rothamel |
| 5,959,205 A | * | 9/1999 | Yamaya et al. ................ 73/468 |
| 6,286,906 B1 | * | 9/2001 | Nagashima et al. ....... 301/5.21 |
| 6,364,421 B1 | * | 4/2002 | Pursley ...................... 301/5.21 |

FOREIGN PATENT DOCUMENTS

| | | | | |
|---|---|---|---|---|
| JP | 3-272347 | * | 12/1991 | ................. 301/5.21 |
| JP | 2000-9184 | * | 6/1998 | |
| JP | 11-257437 | * | 10/1998 | |
| JP | 2001-317598 | * | 5/2000 | |
| WO | WO 99/31406 | * | 6/1999 | |

* cited by examiner

Primary Examiner—Russell D. Stormer
(74) Attorney, Agent, or Firm—Barnes & Thornburg

(57) ABSTRACT

A weight for correcting imbalance in a rotary element includes a number of discrete weights. The number of discrete weights is selected to substantially correct the imbalance. A piece of double sided tape has sufficient length for the number of discrete weights to be adhered to the length of double sided tape. A removable film protects the side of the tape opposite the side to which the discrete weights are adhered. The film reduces the likelihood of contamination until the film is removed to expose the side of the tape opposite the side to which the discrete weights are adhered, permitting the weight to be applied to the rotary element.

18 Claims, 3 Drawing Sheets

INDIVIDUAL SEGMENT ADHESIVE CORRECTION WEIGHT

FIELD OF THE INVENTION

This invention relates to a balancing device for correcting imbalance in rotary elements. The invention is disclosed in the context of a wheel balancing device including correction weight for correcting imbalance in vehicle wheel-and-tire assemblies. The invention is believed to be useful in other applications as well.

BACKGROUND OF THE INVENTION

Weights for application to rotary elements, such as vehicle wheel and tire assemblies to correct imbalance in such elements, are known. There are, for example, the systems illustrated and described in U.S. Pat. No. 3,960,409 and the references cited in that patent. There are also the devices described in U.S. Pat. Nos. 2,029,132; 2,640,727; 3,154,347; 3,177,039; 3,273,941; 3,748,910; 3,786,850; 3,905,648; 4,300,803; 4,379,596; 5,557,043; 5,831,152; and, 5,959,205. The disclosures of those references are hereby incorporated herein by reference. No representation is intended that a complete search has been made of the prior art or that no better art than that listed is available, and no such representation should be inferred. This listing shall not be construed to be an admission that the listed references are, or are considered to be, material to patentability.

In recent years, some vehicle wheel designs have evolved that do not permit the use of pound-on imbalance correcting weights on the outwardly facing, or "curb" side of the wheel. These wheels are sometimes called "flangeless" or "soft face" wheels. Flangeless or soft face wheels generally require adhesive weights to be applied from the car side of the tire and wheel assembly to the inside diameter of the wheel to correct some portion of the imbalance in the assembly. Currently, an operator selects a specific size weight from a row of bins, removes the protective tape and applies the weight to the wheel. This process is slow and it is easy for the operator to select the wrong weight. In addition, typical currently available adhesive weights are made from pieces of lead with protective coatings to reduce the likelihood of direct worker contact with the lead. These one-piece weights are preformed to a specific wheel radius. Workers sometimes reshape the weights to the radius of a wheel for which the weights were not originally made. Otherwise, optimal adherence of the adhesive weight will not be achieved. These characteristics lead to additional work and rework at imbalance correcting stations for wheel and tire assemblies.

Another currently available system pulls extruded lead, with adhesive already applied, from a coil of extruded lead, forms the extruded lead to a particular radius, and then cuts the amount of extruded lead necessary to achieve a particular amount of imbalance correction. Weights formed using this system leave the ends of the lead weights exposed to contact with workers. This exposed lead is unacceptable to many manufacturers. Also, as noted, this system forms the extruded lead to only one radius. Again, this means that if the weight is to be applied to a wheel having another radius, the worker must reshape the weight to the desired curvature. Additionally, lead is heavy, resulting in the coils having limited capacity. This results in frequent replacement of the somewhat unwieldy coils.

The weight of the present invention is intended to address a number of these shortcomings of prior art weight application systems.

SUMMARY OF THE INVENTION

According to the invention, a weight for correcting imbalance in a rotary element includes a number of discrete weights. The number of discrete weights is selected to substantially correct the imbalance. The invention further includes a length of double sided tape sufficient for the number of discrete weights to be adhered to the length of double sided tape. A removable film protects the side of the tape opposite the side to which the discrete weights are adhered. The film reduces the likelihood of contamination until the film is removed to expose the side of the tape opposite the side to which the discrete weights are adhered, permitting the weight to be applied to the rotary element.

Illustratively according to the invention, the discrete weights are substantially uniform in weight.

Further illustratively according to the invention, the length of double sided tape is elastic, permitting it to stretch slightly during application to the rotary element.

Additionally illustratively according to the invention, the discrete weights are coated with a coating which reduces the likelihood of contact by someone handling the weight with the discrete weights.

Illustratively according to the invention, each of the discrete weights includes an external surface, the entirety of which is coated with the coating.

Illustratively according to the invention, the discrete weights are substantially uniform in configuration.

Further illustratively according to the invention, the discrete weights are generally right rectangular prism shaped.

Additionally illustratively according to the invention, the discrete weights have somewhat rounded corners between at least two adjacent sides providing a detectable boundary between adjacent discrete weights to aid in determining the number of discrete weights in the weight.

Illustratively according to the invention, each of the discrete weights includes an upper surface spaced apart from the double sided tape, and a lower surface that is coupled to the double sided tape. A first side and a second side connect the upper surface and the lower surface. The lower surface of each of the discrete weights is planar from its junction with the first side to its junction with the second side.

BRIEF DESCRIPTION OF THE DRAWINGS

The invention may best be understood by referring to the following detailed description and accompanying drawings which illustrate the invention. In the drawings.

DETAILED DESCRIPTION OF AN ILLUSTRATIVE EMBODIMENT

Figure 1:
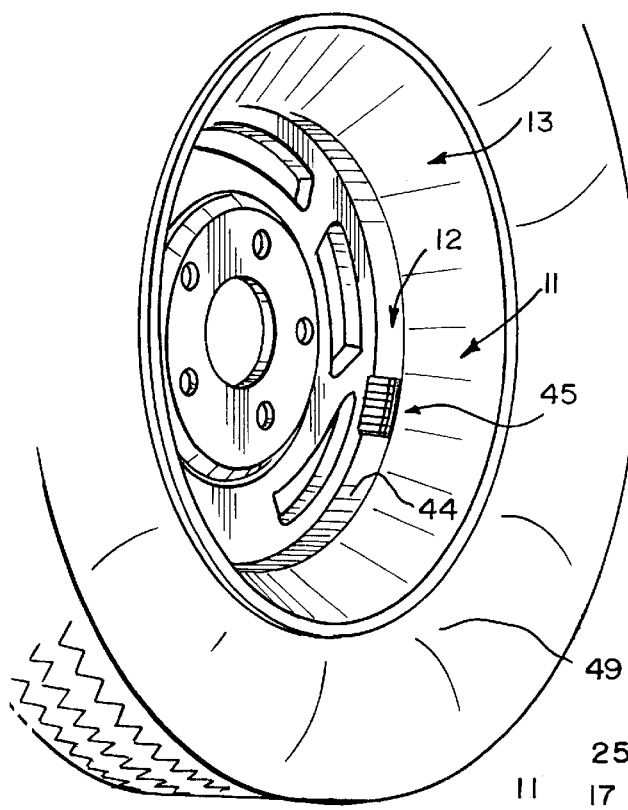
FIG. 1 illustrates a perspective view of a vehicle wheel-and-tire assembly having an amount of imbalance correcting weight in the form of discrete, coated weights, adhered to an inner, or vehicle side, rim of the wheel.
Figure 3:
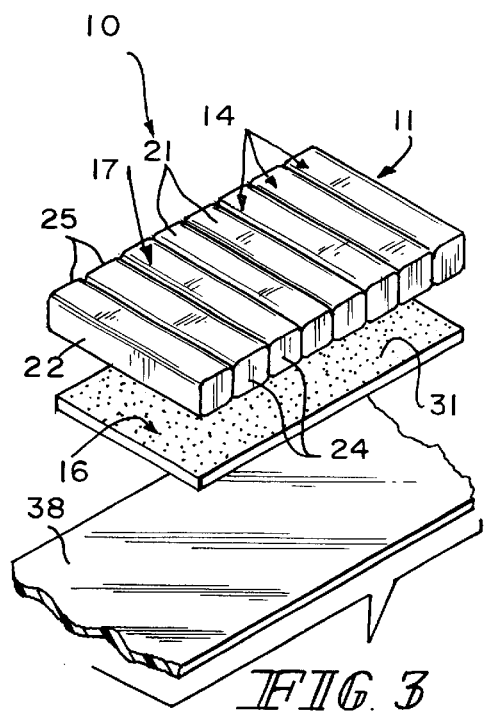
FIG. 3 illustrates an exploded perspective view of an amount of imbalance correcting weight in the form of discrete, adhesive coated weights and a protective backing strip.
Figure 2:
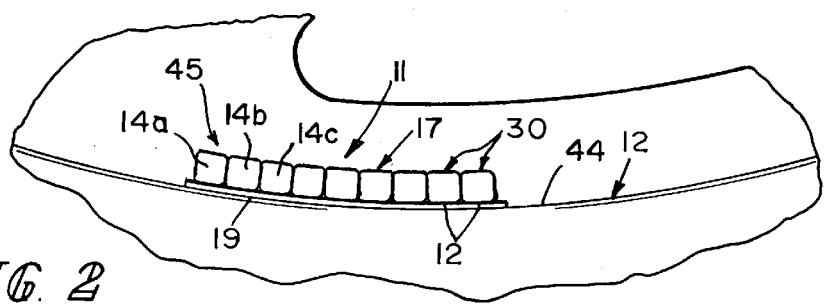
FIG. 2 illustrates an enlarged, fragmentary elevation view of the assembly illustrated in FIG. 1.

A weight assembly 10 includes a weight 11 and a protective backing strip 38 configured to be coupled to a rotary element 49, such as a wheel-and-tire assembly, to correct imbalance in the rotary element 49, as illustrated in, for example, FIGS. 1–3. To correct imbalance in wheel-and-tire assembly 49, a length 45 of weight 11 which is sufficient substantially to cure the imbalance in the wheel-and-tire assembly 49 is adhered to a radially inwardly facing, generally cylindrical surface 44 of a vehicle wheel 13, as illustrated in, for example, FIGS. 1 and 2. Weight 11 includes at least one discrete coated weight 14 of substantially uniform right rectangular prism shape and size and a continuous strip of double-side, stretchable adhesive tape 16 of sufficient length and width to hold the number of discrete weights 14 required to substantially cure the imbalance in the wheel-and-tire assembly 49 onto surface 44 of wheel 13, as illustrated in, for example, FIGS. 3–6, 8 and 11. Adhesive tape 16 illustratively is a polyurethane foam with an acrylic adhesive, such as, for example, 0.8 millimeter thick NOR-MOUNT® Z530 mounting tape from Norton Company of Worcester, Mass.

As will be explained, weight 11 is configured to accommodate surfaces 44 presenting a wide variety of radii of curvature. Using a uniform configuration of discrete weights 14 minimizes the number of weights an operator must maintain in his or her inventory. It further avoids having to maintain separate storage bins for each of a variety of weight sizes and/or configurations, so that the operator does not need to select different weights from different storage bins to correct an imbalance.

Figure 9:
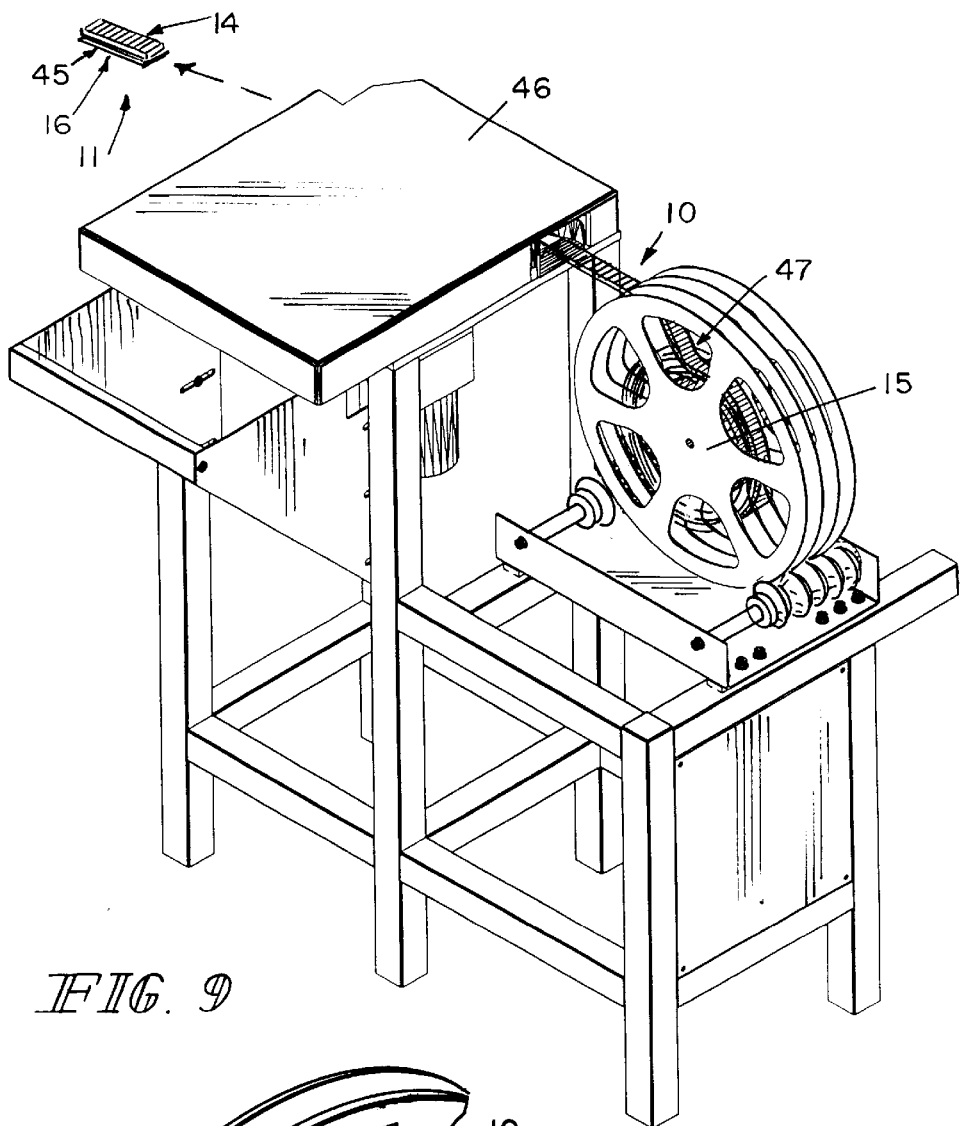
FIG. 9 illustrates a perspective view of a dispensing mechanism including a spool supporting a supply of balancing weights constructed according to the invention.
Figures 10, 11:
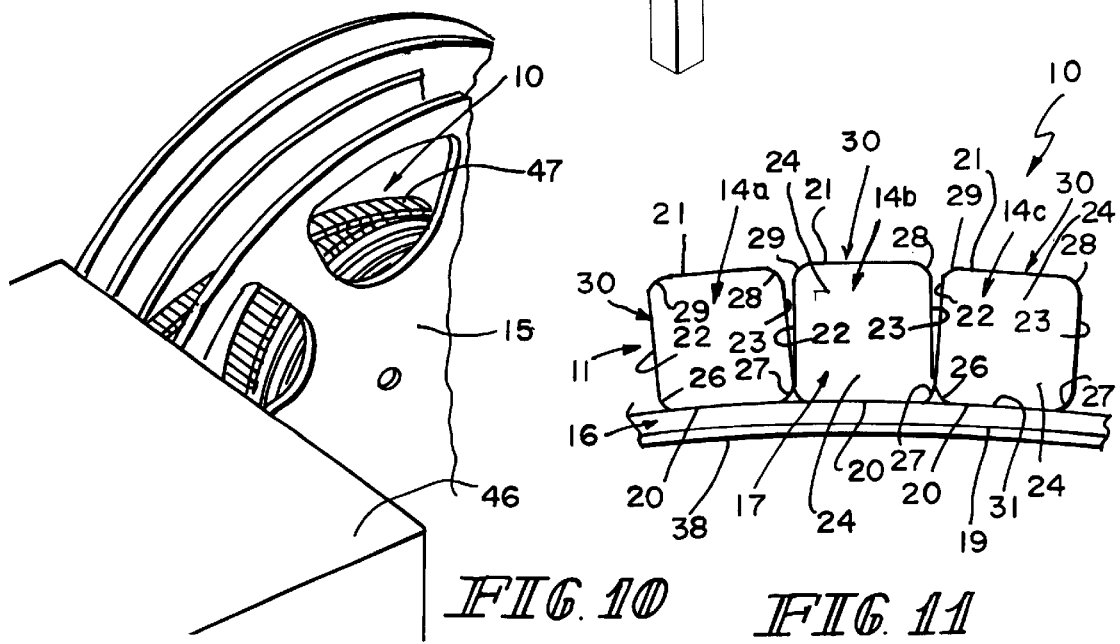
FIG. 10 illustrates a fragmentary perspective view of the mechanism illustrated in FIG. 9.
FIG. 11 illustrates a fragmentary side elevational view of a detail of the mechanism illustrated in FIGS. 9–10.

Weight 11 is arranged in strip form to permit a dispenser 46 to dispense sections 45 of weight 11 having the desired weight to correct imbalances in the range of imbalances encountered in wheel-and-tire assemblies 49 from a supply 47 of weight 11 stored on a spool 15, as illustrated in, for example, in FIGS. 9–11. In the illustrated embodiment, dispenser 46 is configured to provide lengths 45 of balancing weight 11 having from one to thirty-five discrete weights 14.

Figure 4:
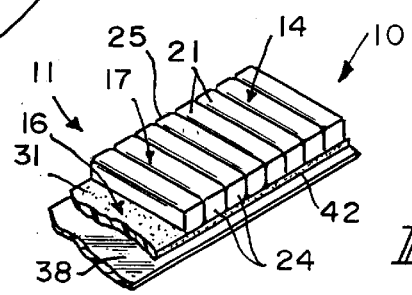
FIG. 4 illustrates an assembled view of the components illustrated in FIG. 3.
Figure 5:
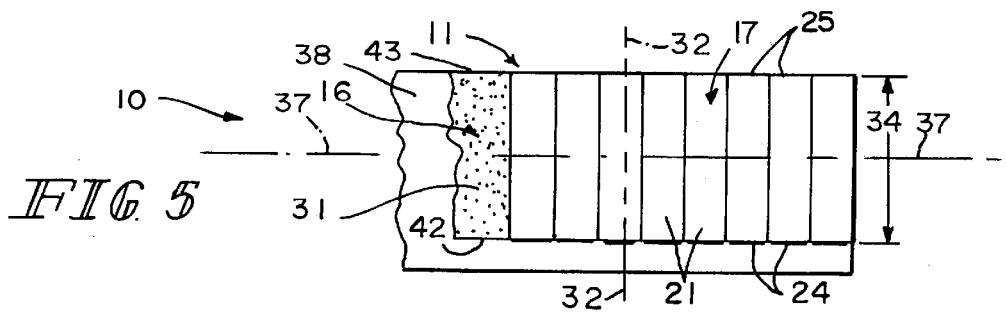
FIG. 5 illustrates a top plan view of the components illustrated in FIGS. 3–4.

Continuous protective backing strip 38 is coupled to adhesive tape 16 before section 45 of weight 11 is secured to vehicle wheel 13, as illustrated in, for example, in FIGS. 3–5. Protective backing strip 38 is coupled to adhesive surface 19 of tape 16 to protect surface 19 from contamination until protective backing strip 38 is peeled off surface 19 as at 48 and surface 19 applied to surface 44 of wheel 13, as illustrated in, for example, FIG. 1.

Discrete weights 14 are illustrated in, for example, FIGS. 3–6. Discrete weights 14 are generally uniform in size, shape and weight. Each discrete weight 14 includes generally flat, generally parallel side surfaces 20, 21 and 22, 23, generally flat, generally parallel end surfaces 24, 25, and rounded corners 26, 27, 28, 29. Surface 20 of each discrete weight 14 is adhered to surface 31 of adhesive tape 16. The long dimensions of discrete weights 14 extend generally transversely across the length of tape 16.

Figure 6:
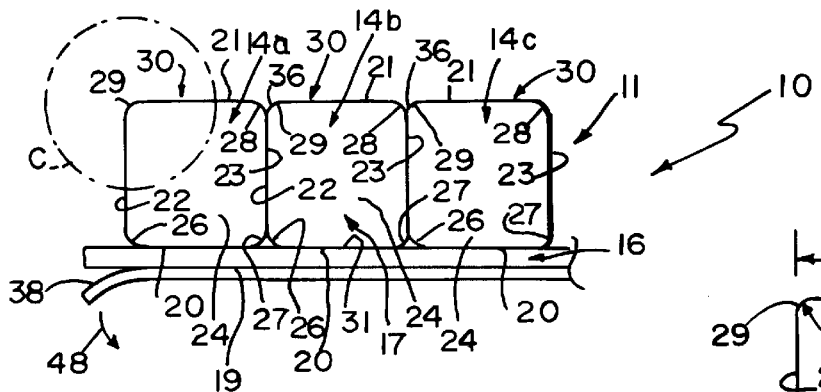
FIG. 6 illustrates an enlarged fragmentary side elevation view of the assembled components illustrated in FIGS. 2, 4 and 5.

The illustrated discrete weights 14 are substantially square in cross-section transverse to their longitudinal extents 32, as illustrated in, for example, FIG. 6. The illustrated discrete weights 14 have somewhat narrower dimensions 33 lengthwise of tape 16. An illustrative dimension 33 is about 4.5 millimeters and an illustrative length 34 is about 16.2 millimeters.

Figure 12:
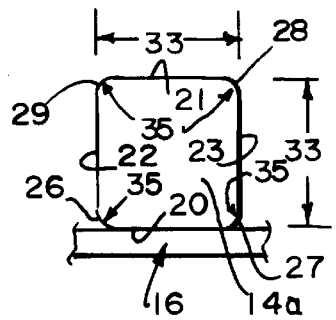
FIG. 12 illustrates an end elevational view of a single discrete weight.
Figure 7:
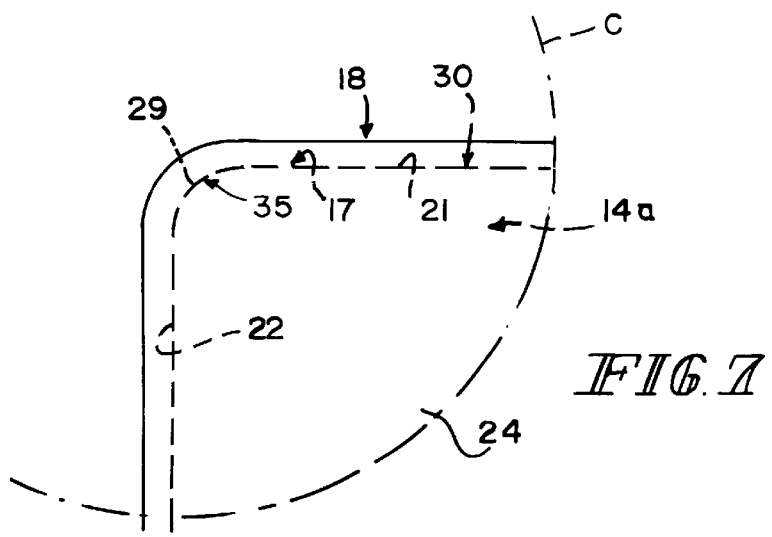
FIG. 7 illustrates a much enlarged detail of the view illustrated in FIG. 6.

Each discrete weight 14 illustratively is made of lead. The entire external surface 17 of each discrete weight 14 is coated with a protective coating 18 made of a polymer material to protect operators handling weights 11 against exposure to lead. Coating 18 is illustrated in, for example, FIG. 7. The lead in the discrete weights 14 is thus more or less completely coated with protective coating 18. In an illustrative embodiment, each discrete weight 14 weighs about 3.5 grams (about one-eighth ounce). As previously noted, each of corners 26, 27, 28, 29 is rounded as indicated at 35 so that recesses 36 are formed between adjacent discrete weights 14, as illustrated, for example, with respect to discrete weights 14a, 14b, and 14c in FIGS. 6, 7, and 12. Recesses 36 are configured to permit a dispenser mechanism 46 to distinguish between individual, discrete weights 14 to select the number of discrete weights 14 required for a particular imbalance correction application. In preferred embodiments, radius 35 is about 0.75 millimeters Discrete weights 14 of representative section 45 are aligned along adhesive tape 16, as illustrated for example, in FIG. 5. Longitudinal extent 32 of each discrete weight 14 is substantially perpendicular to a longitudinal extent 37 of adhesive tape 16. End surfaces 24, 25 of each discrete weight 14 lie adjacent edges 42, 43 of adhesive tape 16. Discrete weights 14 are oriented side by side generally parallel to one another. Depending upon the orientation of weight 11, adjacent discrete weights 14 may or may not contact one another. However, in the illustrative embodiment, the discrete weights 14 contact each other substantially from end to end on adjacent faces to reduce to a minimum the length of tape 16 required to correct a given imbalance. When weight 11 is placed on a flat surface before adhesive tape 16 is stretched, adjacent side surfaces 22, 23 are flat against one another substantially from end surface 24 to end surface 25, as illustrated, for example, in FIGS. 4–6.

When weight 11 is placed on a convex surface before adhesive surface 16 is stretched, such as when weight 11 is wound around spool 15, discrete weights 14 lie radially outwardly relative to the portion of adhesive tape 16 to which discrete weights 14 are secured, as illustrated, for example, in FIGS. 9–11. Adjacent discrete weights 14 positioned along a larger radius of curvature may contact one another near respective edges 26, 27, as illustrated, for example, in FIG. 11, while adjacent discrete weights 14 positioned along a smaller radius of curvature are more likely to become spaced apart from one another.

Figure 8:
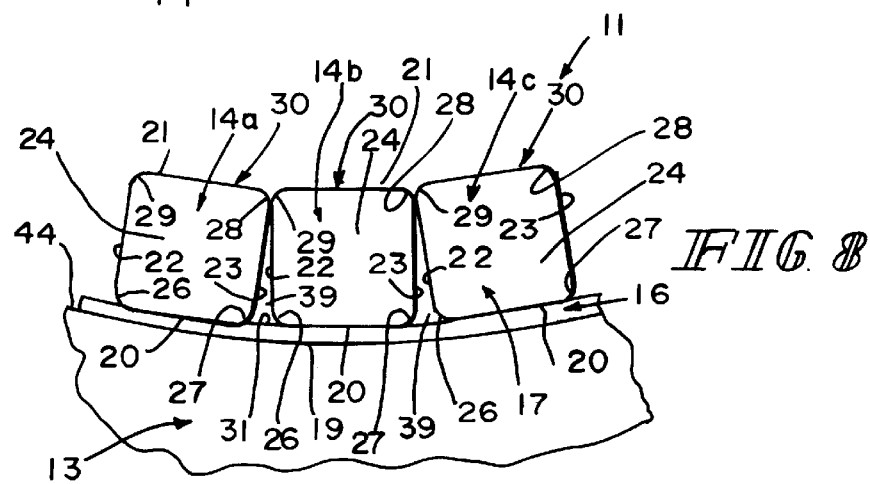
FIG. 8 illustrates an enlarged fragmentary side elevation view of the assembled components illustrated in FIGS. 2, 4, 5 and 6 applied to the rim of a vehicle wheel.

When protective backing strip 38 is removed from wheel-adhering surface 19 and weight 11 is secured to a concave surface, such as surface 44, adjacent discrete weights 14 contact one another at a location toward respective edges 28, 29 such that adjacent discrete weights 14 and adhesive tape 16 cooperate to form a somewhat triangular-shaped space 39 between adjacent discrete weights 14, as illustrated, for example, in FIG. 8. At the same time, adhesive tape 16 is stretched to accommodate a radius of curvature of wheel 13 so that adhesive tape 16 conforms to surface 44 to secure discrete weights 14 thereto. Surfaces 20 of adjacent discrete weights 14 lie farther apart from one another when adhesive tape 16 is stretched than when it is not.

The configuration of each of discrete weights 14, the arrangement of discrete weights 14 along surface 31, and the stretchability of adhesive tape 16 cooperate so that substantially the entire surface 19 of a section 45 of weight 11 adheres to rim surface 44, as illustrated, for example, in FIGS. 2 and 8. At the same time, substantially the entire surface 20 of each discrete weight 14 is effectively coupled to surface 44 through adhesive tape 16. Thus, weight 11 accommodates a wide variety of vehicle wheel radii of curvature using uniform discrete weights 14 without requiring reformation of discrete weights 14 to fit weight 11 to a particular vehicle wheel size.

To balance wheel 13, a section 45 of weight 11 is obtained from supply 47, as illustrated, for example, in FIGS. 10 and 11. Dispenser mechanism 46 counts out the required number of discrete weights 14 to correct an imbalance using edges 28, 29 in the counting process to distinguish between individual, discrete weights 14. Protective backing strip 38 is removed to expose surface 19 for adhesion to surface 44. Dispenser mechanism 46 severs tape 16 at a location between adjacent discrete weights 14 without damaging protective coating 18 to provide the required amount of weight for the particular imbalance correction application. In the illustrated embodiment, dispenser mechanism 46 provides weight 11 having from one to 35 discrete weights 14.

Surface 19 of section 45 of weight 11 is then applied to rim surface 44, for example, as illustrated in FIG. 2. Adhesive strip 16 is conformed to surface 44 to accommodate the wheel 13's radius of curvature. Typically, each discrete weight 14 is oriented generally parallel to wheel 13's axis of rotation.

What is claimed is:

1. An apparatus for correcting an imbalance in a rotary element, the apparatus including a number of weights, each weight including a generally planar bottom surface, a tape having a top surface and a bottom surface, the top surface of the tape coupled to the bottom surface of each weight, the bottom surface of the tape having an adhesive layer configured for securely attaching the device to the rotary element, the tape being elastic to permit the bottom surfaces of the weights to move apart from one another when the apparatus is attached to the rotary element, and a removable film coupled to the adhesive layer.

2. The apparatus of claim 1 wherein the weights are substantially uniform in configuration.

3. The apparatus of claim 2 wherein the bottom surface of each weight is generally rectangular.

4. The apparatus of claim 3 wherein the weights are substantially uniform in mass.

5. The apparatus of claim 1 wherein each weight further includes a first end surface, a second end surface, and a coating material, the first end surface is spaced apart from a second end surface by a length, and each end surface is coated by the coating material.

6. The apparatus of claim 1 wherein each weight further includes an external surface coated by the coating material.

7. The apparatus of claim 6 wherein the weights have somewhat rounded corners between at least two adjacent sides providing a detectable boundary between adjacent weights.

8. The apparatus of claim 1 wherein the weights have somewhat rounded corners between at least two adjacent sides providing a detectable boundary between adjacent weights.

9. The apparatus of claim 1 wherein each weight further includes lead and a coating material, the lead being coated by the coating material.

10. An apparatus for correcting an imbalance in a rotary element, the apparatus including a coating material, a number of weights, each weight including a first end surface, a second end surface, and a bottom surface, the bottom surface connecting the first and second end surfaces, each end surface being coated by the coating material, a tape having a top surface and a bottom surface, the top surface of the tape coupled to the bottom surface of each weight such that the end surfaces of the weights are adjacent, the bottom surface of the tape having an adhesive layer configured for securely attaching the tape with at least one weight coupled thereto to the rotary element, and a removable film coupled to the adhesive layer, wherein the bottom surface of each weight is generally rectangular, wherein the bottom surface of each weight is generally planar, and wherein the tape is elastic to permit the bottom surfaces of the weights to move apart from one another when the apparatus is attached to the rotary element.

11. The apparatus of claim 10 wherein the weights are substantially uniform in configuration.

12. The apparatus of claim 10 wherein the weights are substantially uniform in mass.

13. The apparatus of claim 10 wherein each weight further includes first and second sides, the bottom surface connecting the sides, and the weights have somewhat rounded corners between at least two adjacent sides providing a detectable boundary between adjacent weights.

14. The apparatus of claim 13 wherein each weight further includes lead and a top surface, the top surface connecting the sides, the top surface and the sides being coated by the coating material.

15. An apparatus for correcting an imbalance in a rotary element, the apparatus including a coating material, a number of weights, each weight including a first end surface, a second end surface, and a bottom surface, the bottom surface connecting the first and second end surfaces, each end surface being coated by the coating material, a tape having a top surface and a bottom surface, the top surface of the tape coupled to the bottom surface of each weight, the bottom surface of the tape having an adhesive layer configured for securely attaching the device to the rotary element, the tape being elastic to permit the bottom surfaces of the weights to move apart from one another when the apparatus is attached to the rotary element, and a removable film coupled to the adhesive layer.

16. The apparatus of claim 15 wherein the weights are substantially uniform in configuration.

17. The apparatus of claim 16 wherein the bottom surface of each weight is generally planar and rectangular.

18. The apparatus of claim 17 wherein the weights are substantially uniform in mass.

* * * * *